United States Patent
Pilu et al.

(10) Patent No.: US 7,432,930 B2
(45) Date of Patent: Oct. 7, 2008

(54) DISPLAYING DIGITAL IMAGES

(75) Inventors: Maurizio Pilu, Bristol (GB); David Arthur Grosvenor, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 1151 days.

(21) Appl. No.: 10/202,789

(22) Filed: Jul. 24, 2002

(65) Prior Publication Data

US 2003/0025804 A1 Feb. 6, 2003

(30) Foreign Application Priority Data

Jul. 31, 2001 (GB) .................. 0118668.3

(51) Int. Cl.
*G06T 15/70* (2006.01)
*G06T 13/00* (2006.01)
*H04N 5/222* (2006.01)

(52) U.S. Cl. .................. 345/474; 345/419; 348/333.01; 348/220.1

(58) Field of Classification Search ................. 345/619, 345/473, 474; 348/220.1, 333.01
See application file for complete search history.

(56) References Cited

U.S. PATENT DOCUMENTS

| 5,616,031 | A | * | 4/1997 | Logg | ............................ | 434/38 |
|---|---|---|---|---|---|---|
| 6,124,859 | A | | 9/2000 | Horii et al. | | |
| 6,154,251 | A | | 11/2000 | Taylor | | |
| 6,191,808 | B1 | * | 2/2001 | Katayama et al. | ............. | 348/39 |
| 6,222,557 | B1 | * | 4/2001 | Pulley et al. | ................ | 345/622 |
| 6,362,850 | B1 | * | 3/2002 | Alsing et al. | ................ | 348/239 |
| 6,587,119 | B1 | * | 7/2003 | Anderson et al. | ........... | 345/672 |
| 6,930,687 | B2 | * | 8/2005 | Grosvenor et al. | .......... | 345/473 |
| 7,019,748 | B2 | * | 3/2006 | Raskar | ....................... | 345/473 |
| 7,085,409 | B2 | * | 8/2006 | Sawhney et al. | ............ | 382/154 |
| 2002/0141655 | A1 | * | 10/2002 | Niemi et al. | ................ | 382/276 |
| 2003/0052890 | A1 | * | 3/2003 | Raskar et al. | ............... | 345/581 |

FOREIGN PATENT DOCUMENTS

WO WO95/19093 7/1995

* cited by examiner

*Primary Examiner*—M Good Johnson

(57) ABSTRACT

A method of displaying a digital image comprises the steps of: providing a processor with image data for generating a displayable image, which image data is from a plurality of static digital images, the processor generating a displayable rendered image from the image data, determining a rostrum path to display part of the displayable rendered image and generating a novel viewpoint simulating a different viewing angle. A corresponding computer system is also disclosed.

16 Claims, 3 Drawing Sheets

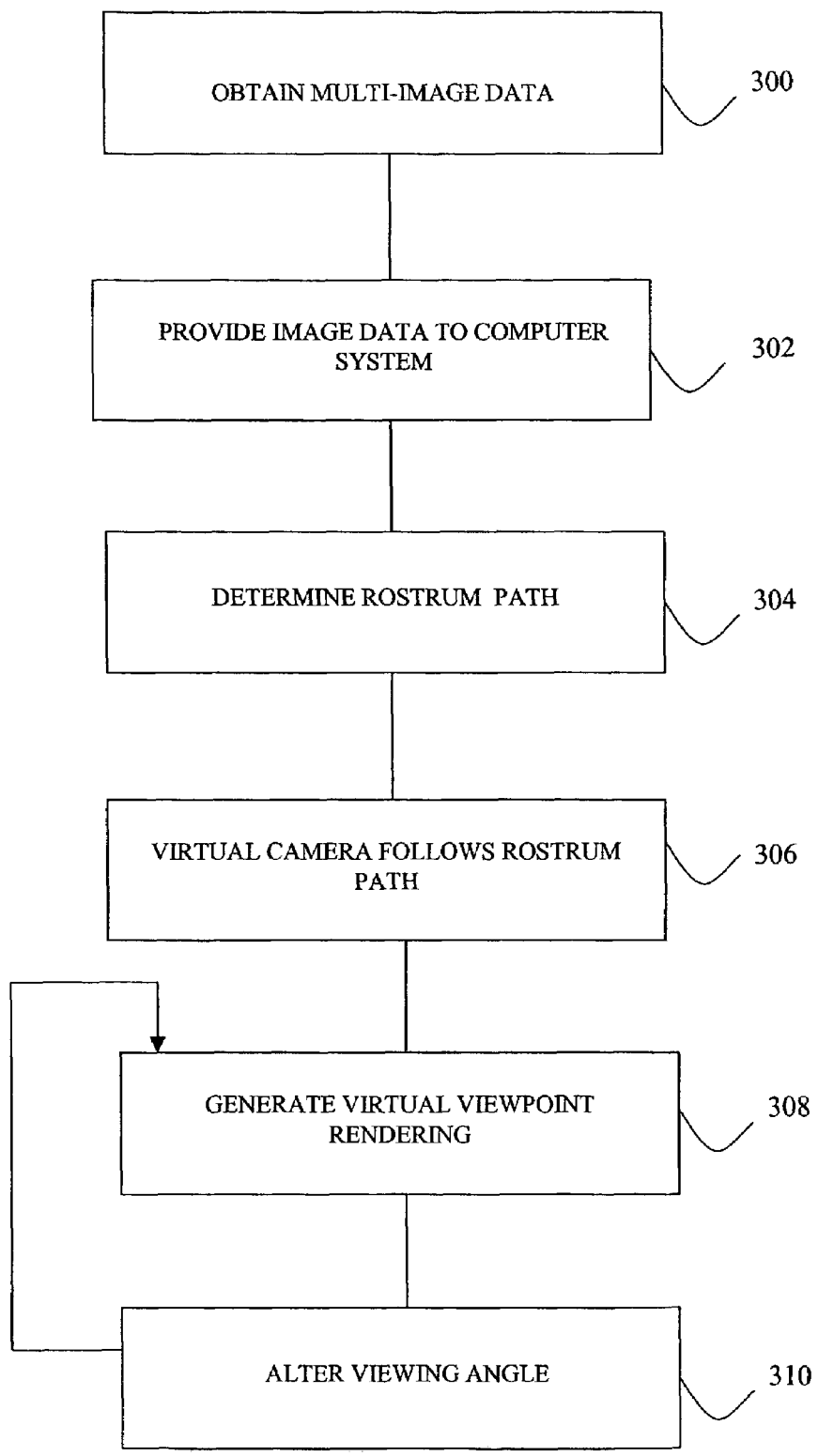

DISPLAYING DIGITAL IMAGES

INCORPORATION BY REFERENCE

This application incorporates by reference the disclosure of U.S. patent application Ser. No. 10/078,818 entitled "Method of Displaying a Digital Image", filed on 19 Feb. 2002.

FIELD OF INVENTION

The present invention relates to methods of displaying digital images and to computer systems therefor.

DISCUSSION OF PRIOR ART

To increase the level of interest in and take advantage of the resolution in static digital images produced, in particular, from digital cameras, it has been proposed to provide a rostrum path over the image in which the view zooms in on an area (being a part of the image) of the image and moves to another part of the image. This produces a moving viewpoint over the image. The image part may be selected manually or, as proposed in our co-pending U.S. patent application Ser. No. 10/078,818, automatically; the latter being referred to as an "auto-rostrum". In the auto-rostrum method machine-vision techniques are used to find areas of interest or salience in the image for the rostrum path to follow.

One way of considering the rostrum path is that a virtual camera is moving over the area of an image and is moving in a plane parallel to the image.

It is still, however, desirable to find ways in which to increase the variation of and level of interest in the images displayed.

SUMMARY OF INVENTION

According to the present invention in a first aspect, there is provided a method of displaying a digital image, the method comprising the steps of: providing a processor with image data for generating a displayable image, which image data is from a plurality of static digital images, the processor generating a displayable rendered image from the image data, determining a rostrum path to display part of the displayable rendered image and generating a novel viewpoint of part of the rendered image simulating a different viewing angle.

Suitably, the virtual viewpoint is generated by rerendering of explicitly recovered 3D depth information, by image transfer, image-based rendering or image morphing.

Suitably, the rostrum path is determined automatically.

Suitably, the rostrum path is between areas of interest and an area of interest for the rostrum path is determined at least in part based on an assessment of 3D characteristics of the image.

Suitably, the viewing angle variation is constrained to render only areas for which the virtual viewpoint can be generated above a predetermined threshold.

Suitably, the viewing angle variation is user controlled.

Suitably, a plurality of viewing angle variations are available and a user can select one or more thereof to be displayed.

According to the present invention in a second aspect, there is provided a computer system for displaying a digital image, the system comprising a processor and a data input channel for receiving image data for the processor from a plurality of static digital images, in which the processor is configured to generate a set of video data representing displayable motion over the image and for generating a novel viewpoint of the part of the rendered image simulating a different viewing angle.

Thus an at least partial 3D exploration of various parts of the image can be provided.

BRIEF DESCRIPTION OF DRAWINGS

The present invention will now be described, by way of example only, with reference to the drawings that follow; in which:

FIG. 3 is a functional flow diagram illustrating a method of an embodiment of the present invention.

SPECIFIC DESCRIPTION OF PREFERRED EMBODIMENTS

Figure 1:
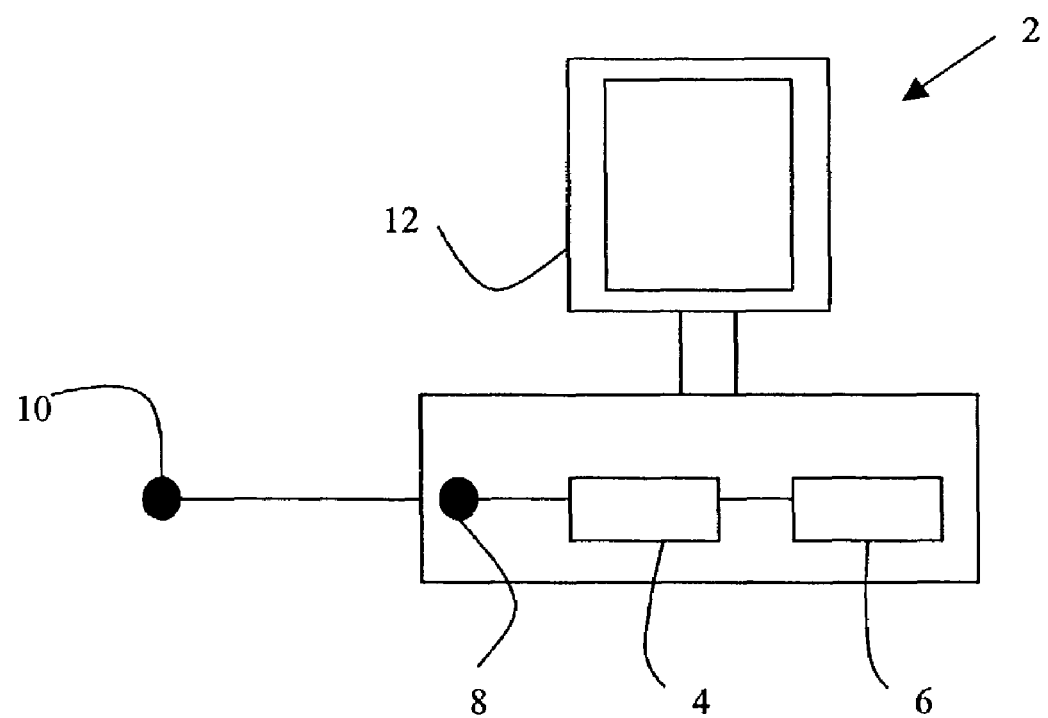
FIG. 1 is a schematic illustration of a computer system according to an embodiment of the present invention.

FIG. 1 of the drawings that follow shows a computer system 2 comprising a processor 4 connected to a memory device 6. A data input channel 8 is configured to receive digital image data from a digital image data source 10 and supply the digital image data to processor 4, which can display images on display device 12. Typical sources of such digital data are data carriers (e.g. floppy disks and CD-ROMs), scanned inputs or web downloads. Processor 4 can also generate and render digital image data.

Computer system 2 is programmed and configured to operate according to the present invention.

Figure 2:
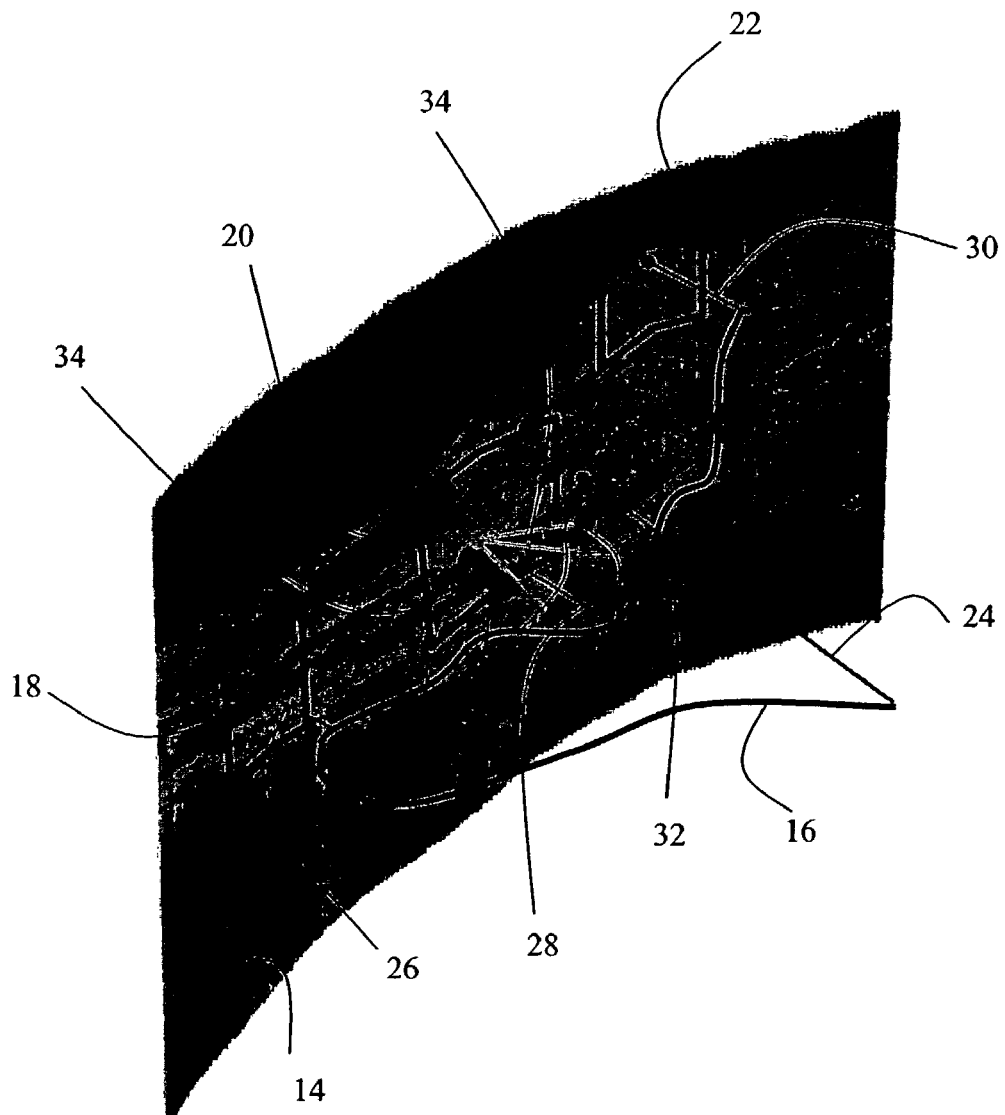
FIG. 2 is a diagrammatic illustration of an image and a virtual viewpoint path according to an embodiment of the present invention.

FIG. 2 of the drawings that follow shows a rendered static digital image 14 of a type that can be displayed on display device 12. The full frame image is shown. A virtual camera (not shown) rostrum path is shown by line 16, which path is to view areas of interest, first 18, second 20 and third 22. The areas of interest 18-22 are framed by boxes, which also show the respective level of zoom in each case. These form image parts. Lines 24, 26, 28 and 30 show the specific areas (indicated by the dot at the end of the line) of the image over which the virtual camera is centred at a specific part of its rostrum path 16. Thinner line 32 shows the simulated variation of the viewing angle over second part of interest 20 according to this embodiment of the present invention.

Referring additionally to FIG. 3 of the drawings that follow, a method of an embodiment of the present invention is next described.

In step 300 the data necessary for creating a virtual viewpoint is first obtained from multiple images of a scene. Usually this will be by a digital camera (not shown) making two or more image captures of a specific scene from different angles. The more image data from different angles obtained generally the better the virtual viewpoint generation will be.

In step 302 the image data is provided as a digital image data source 10 to the computer system 2 via data input channel 8 and stored in memory device 6 for use by processor 4.

In step 304 a rostrum path for a virtual camera is determined. This can be done manually by the user making a selection of image parts or regions of interest, but preferably is done automatically according to the method described in our co-pending U.S. patent application Ser. No. 10/078,818, the content of which is incorporated herein by reference. Thus, regions of interest in the image are determined and a rostrum path between them is determined. This includes a determination of how each image part corresponding to the regions of interest is to be displayed (typically the level of zoom to be used) as well as how the transition between each region of interest will occur, generally by zooming out, the moving and zooming to then next region of interest.

In addition to the disclosure of U.S. patent application Ser. No. 10/078,818, the rostrum path determination may optionally include an assessment of a 3D level of interest. That is the areas of interest assessment can be varied according to the saliency of the region in 3D, for instance based on the clustering of depth values at that point. Further there may be a variation in the assessment of areas of interest because, for instance, a change of viewing angle of a mountain or landscape scene may add little for the viewer, whereas a change of viewing angle in relation to an image of a group of people may reveal a lot and be of interest. So, the saliency or area of interest determination may be varied by image type. The determination of regions of interest can, effectively, be weighted accordingly to the 3D characteristics of the image.

Thus, the areas of interest of the image at which a variation of viewing angle is to be used to exploit the available 3D information may be determined according to the method of U.S. patent application Ser. No. 10/078,818 based on two-dimensional (2D) regions of interest, and/or be weighted according to saliency in 3D.

An area of 3D interest in image 14 is second region of interest 20.

Once the rostrum path has been determined, it is followed by displaying the regions of interest (step 306); the equivalent of the virtual camera following the rostrum path 16.

When the rostrum path 16 reaches second region of interest 20, a virtual viewpoint rendering of the image 14 is generated (step 308).

A virtual viewpoint rendering of some or all of a scene can be generated by a number of different techniques. In general these techniques involve obtaining image data from at least two difference angles relative to the scene (step 300) and generating from the multi-image data a rendered "map" of the scene. A virtual viewpoint can be generated by re-rendering of explicitly recovered 3D depth information, by image transfer, image-based rendering or image morphing. The morphing technique does not use 3D data as such to render the image but still generates an image at least partly viewable in 3D.

Virtual, novel viewpoints can be generated from two or more original images of a scene. For instance, dense stereo matching techniques can be used for generating a 3D map of a scene and rendering virtual viewpoint by rotating the 3D data set and texture mapping Quenot, G. M. Image Matching using Dynamic Programming: Application to Stereovision and Image Interpolation, Image Communication, 1996. Another technique is image transfer that, using uncalibrated (possibly multi-image) stereo and knowledge of the weak-calibration of the camera compute and render the novel viewpoints pixel by pixel without knowing their effective depth (e.g. Laveau, S & Faugeras, O., "3D Scene Representation as a Collection of Images and Fundamental Matrices", INRIA Tech Report 2205, February 1994. Another class of methods called image-based rendering work by selectively and individually morphing portions of two or more original views of a scene in order to generate a virtual viewpoint (Seitz, S. M. [Steven M.], Dyer, C. R. [Charles R.], View Morphing, SIG-Graph (30), 1996, pp. 21-30. New Orleans. Pollard, S., Pilu. M, Hayes. S., Lorusso, A, View Synthesis by Trinocular Edge Matching and Transer, IVC Journal (18), No.9, June 2000, pp. 749-757).

In the example of the present invention described above, the viewing angle variation is controlled automatically as part of the rostrum path determination. However, it is also possible for the user to have manual control of the viewing angle. Further the user may be able to specify the type of viewing angle changes to be displayed, from a set of control options such as up-down, left-right, conic rim, small, medium or large etc. The user may also be given options such as to decide whether all regions of interest are explored by changing the viewing angle, just those with a high 3D salience or otherwise.

It will be appreciated that the virtual viewpoint generation may not cover all possible arbitrary viewpoints. That is, there may be regions of the image 14 that the separate image data available does not reveal and, hence, cannot be displayed by rendering or otherwise. For instance a part of the scene may be obscured in all available images from which the virtual viewpoint image is generated. For this reason, the images produced from the techniques referred to above are sometimes referred to as "2.5D". In any event, some depth information is available to the viewer so that when the viewing angle changes it reveals new information from the new angle that would not be available without an angle change (i.e. not visible by moving the virtual camera in the plane of the image without an angle change).

The variation of the viewing angle may, therefore, be constrained so that areas of the scene for which virtual viewpoint rendered data is not available are not displayed. In the case of user controlled viewing angle variation, limits can be placed on the permitted variation to ensure that area for which data is not available are not viewable. For automatic viewing, the viewing angle variation is simply constrained not to show these areas.

In this way unsightly gaps can be avoided.

Once the virtual viewpoint rendering has been generated by processor 4, the viewing angle (or angle of the virtual camera) is changed, keeping the image centred at substantially the same point, to display image data otherwise not visible at another angle (step 310). This may occur straightaway or after a predetermined delay during which the original image is displayed. Referring to FIG. 2, the viewing angle is changed to follow the path 32. Lines 34 illustrate the change in viewing angle.

After viewing second region of interest (image part) 20, the rostrum path continues (step 306) or a further rendering may be generated (step 308).

In an alternative viewing option, the image centre may be changed during or after the change of viewing angle.

In a modified embodiment of the present invention, the rendered image is generated elsewhere and supplied to the computer system 2.

If the areas of interest for the rostrum path are known and fixed, it is possible only to provide rendered image information for the areas of interest for which a novel viewpoint of at least one different angle is generated.

Thus, more interest in images can be generated by providing an exploration thereof with depth information.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of displaying a digital image, the method comprising the steps of:
    providing a processor with image data for generating a displayable image, which image data is from a plurality of static digital images, the processor generating a displayable rendered image from the image data;
    determining a rostrum path of a static digital image to display part of the displayable rendered image, at least one part of the displayable rendered image corresponding to a part of the static digital image at a different viewing angle than provided in the static digital image; and
    generating a novel viewpoint of part of the rendered image simulating the different viewing angle, the novel viewpoint being generated from the image data of at least one other static digital image having a different viewing angle than provided in the static digital image,
    in which the rostrum path is between areas of interest and an area of interest for the rostrum path is determined at least in part based on an assessment of 3D characteristics of the image.

2. A method of displaying a digital image according to claim 1, in which the novel viewpoint is generated by re-rendering of explicitly recovered 3D depth information, by image transfer, image-based rendering or image morphing.

3. A method of displaying a digital image according to claim 1, in which the rostrum path is determined automatically.

4. A method of displaying a digital image according to claim 3, in which the viewing angle variation is constrained to render only areas for which the novel viewpoint can be generated with a visual quality above a predetermined threshold.

5. A method of displaying a digital image according to claim 1, in which a viewing angle variation used in generating the novel viewpoint is user controlled.

6. A method of displaying a digital image according to claim 1, in which a plurality of viewing angle variations are available to be used in generating the novel viewpoint and a user can select one or more thereof to be displayed.

7. A computer system for displaying a digital image, the system comprising:
    a processor; and
    a data input channel for receiving image data for the processor from a plurality of static digital images, in which the processor is configured to generate a set of video data representing displayable motion over the image and for generating a novel viewpoint of the part of the rendered image simulating a different viewing angle than provided in the image, wherein the novel viewpoint is generated from image data of at least one other digital image having a different viewing angle than provided in the image,
    wherein the processor is configured to determine a rostrum path of a static digital image to display part of the displayable rendered image, at least one part of the displayable rendered image corresponding to a part of the static digital image at the different viewing angle,
    in which the rostrum path is between areas of interest and an area of interest for the rostrum path is determined at least in part based on an assessment of 3D characteristics of the image.

8. The system of claim 7, in which the novel viewpoint is generated by re-rendering of explicitly recovered 3D depth information.

9. The system of claim 7, further comprising:
    user controls for controlling viewing angle variation.

10. The system of claim 9, in which the viewing angle variation is constrained to render only areas for which the novel viewpoint can be generated with a visual quality above a predetermined threshold.

11. The system of claim 7, in which the processor accesses a level of interest.

12. A system for displaying a digital image, the system comprising:
    means for providing image data for generating a displayable image, in which the image data is from a plurality of static digital images;
    means for generating a displayable rendered image from the image data;
    means for determining a rostrum path of a static digital image to display part of the displayable rendered image, at least one part of the displayable rendered image corresponding to a part of the static digital image at a different viewing angle than provided in the static digital image; and
    means for generating a novel viewpoint of part of the rendered image simulating the different viewing angle, the novel viewpoint being generated from the image data of at least one other static digital image having a different viewing angle than provided in the static digital image,
    in which the rostrum path is between areas of interest and an area of interest for the rostrum path is determined at least in part based on an assessment of 3D characteristics of the image.

13. The system of claim 12 in which the novel viewpoint is generated by re-rendering of explicitly recovered depth information, by image transfer, image-based rendering or image morphing.

14. The system of claim 12, in which the viewing angle variation is constrained to render only areas for which the novel viewpoint can be generated with a visual quality above a predetermined threshold.

15. The system of claim 12, in which a viewing angle variation used in generating the novel viewpoint is user controlled.

16. The system of claim 12, in which a plurality of viewing angle variations are available to be used in generating the novel viewpoint and a user can select one or more thereof to be displayed.

* * * * *